(12) United States Patent
Schwarz et al.

(10) Patent No.: US 9,957,832 B2
(45) Date of Patent: May 1, 2018

(54) VARIABLE AREA TURBINE

(75) Inventors: Frederick M. Schwarz, Glastonbury, CT (US); Daniel Bernard Kupratis, Wallingford, CT (US)

(73) Assignee: United Technologies Corporation, Farmington, CT (US)

( * ) Notice: Subject to any disclaimer, the term of this patent is extended or adjusted under 35 U.S.C. 154(b) by 1653 days.

(21) Appl. No.: 13/406,748

(22) Filed: Feb. 28, 2012

(65) Prior Publication Data
US 2013/0223974 A1 Aug. 29, 2013

(51) Int. Cl.
*F01D 17/16* (2006.01)
*F02C 9/22* (2006.01)

(52) U.S. Cl.
CPC .............. *F01D 17/162* (2013.01); *F02C 9/22* (2013.01); *F05D 2270/112* (2013.01); *F05D 2270/3032* (2013.01)

(58) Field of Classification Search
CPC ............................... F01D 17/162; F01D 17/14
USPC ................. 415/147, 154.3, 159, 48
See application file for complete search history.

(56) References Cited

U.S. PATENT DOCUMENTS

| | | | |
|---|---|---|---|
| 4,947,643 A | 8/1990 | Pollak et al. | |
| 5,184,459 A | 2/1993 | McAndrews | |
| 5,281,087 A | 1/1994 | Hines | |
| 5,517,817 A | 5/1996 | Hines | |
| 5,911,679 A | 6/1999 | Farrell et al. | |
| 5,931,636 A | 8/1999 | Savage et al. | |
| 6,790,000 B2 | 9/2004 | Wolf | |
| 8,007,229 B2 | 8/2011 | McCaffrey et al. | |
| 2007/0214795 A1* | 9/2007 | Cooker et al. | 60/772 |
| 2009/0067978 A1 | 3/2009 | Suljak, Jr. | |
| 2010/0021285 A1* | 1/2010 | Rowe et al. | 415/125 |
| 2010/0105516 A1* | 4/2010 | Sheridan et al. | 475/346 |
| 2011/0004388 A1* | 1/2011 | Winter | 701/100 |
| 2011/0016876 A1 | 1/2011 | Cataldi et al. | |
| 2012/0304660 A1* | 12/2012 | Kupratis | 60/772 |

FOREIGN PATENT DOCUMENTS

| | | |
|---|---|---|
| EP | 1835130 A2 | 9/2007 |
| EP | 2148044 A2 | 1/2010 |
| EP | 2282016 A2 | 2/2011 |
| EP | 2386723 A2 | 11/2011 |

(Continued)

OTHER PUBLICATIONS

International Search Report and Written Opinion for International Application No. PCT/US2013/025727 completed on Nov. 4, 2013.

(Continued)

*Primary Examiner* — Justin Seabe
*Assistant Examiner* — Juan G Flores
(74) *Attorney, Agent, or Firm* — Carlson, Gaskey & Olds, P.C.

(57) ABSTRACT

A gas turbine engine includes a shaft and a turbine configured to drive the shaft. The turbine has at least one stage comprising a plurality of turbine vanes interspersed with a plurality of turbine blades. The plurality of vanes includes at least one variable vane movable between a closed position to reduce air flow and an open position to increase air flow. Movement of the at least one variable vane is controlled based on an engine limiting condition.

32 Claims, 2 Drawing Sheets

(56) References Cited

FOREIGN PATENT DOCUMENTS

WO 9809066 A1 3/1998

OTHER PUBLICATIONS

International Preliminary Report on Patentability for International Application No. PCT/US2013/025727 dated Sep. 12, 2014.
Singapore Search Report for Singapore Application No. 11201403916S dated Apr. 30, 2015.
Supplementary European Search Report for European Application No. 13785331.3 dated Nov. 19, 2015.

* cited by examiner

VARIABLE AREA TURBINE

BACKGROUND OF THE INVENTION

This disclosure relates to a high pressure turbine for a gas turbine engine with a variable vane configuration.

A typical jet engine has multiple shafts or spools that transmit torque between turbine and compressor sections of the engine. In one example, a low speed spool generally includes a low shaft that interconnects a fan, a low pressure compressor, and a low pressure turbine. A high speed spool generally includes a high shaft that interconnects a high pressure turbine and a high pressure compressor.

Certain physical limitations of the engine affect engine characteristics such as the ultimate fuel burn characteristics, maintenance cost, and thrust ratings (takeoff vs. climb lapse rates), for example. One example of such a physical limitation relates to temperatures before, during, and after take-off. Various components of the engine, such as those in the compressor and turbine sections of the engine for example, can be adversely affected by high temperatures. Thus, the engine is configured to include various systems and mechanisms for cooling purposes. However, during hot days it becomes even more difficult to provide enough cooling flow to provide for adequate turbine life, especially during takeoff and early climb.

SUMMARY OF THE INVENTION

In one exemplary embodiment, a gas turbine engine includes a shaft and a turbine configured to drive the shaft. The turbine has at least one stage comprising a plurality of turbine vanes adjacent a plurality of turbine blades. The plurality of vanes includes at least one variable vane movable between a closed position to reduce gaspath flow and an open position to increase gaspath flow. Movement of the at least one variable vane is controlled based on an engine limiting condition.

In a further embodiment of the above, wherein the engine limiting condition comprises a temperature at a predetermined engine operational condition.

In a further embodiment of any of the above, the predetermined engine operational condition comprises a takeoff condition, and wherein the variable vane is configured to be in the open position during the take-off condition when a temperature exceeds a predetermined temperature level.

In a further embodiment of any of the above, the variable vane is configured to be in a more closed position during a cruise condition than in the takeoff position.

In a further embodiment of any of the above, the engine limiting condition comprises a takeoff condition, and wherein the variable vane is configured to be in a more open position during take-off conditions, and wherein the variable vane is configured to be in a more closed position during cruise conditions.

In a further embodiment of any of the above, the variable vane is initiated to immediately move to a more open position in response to an increase in throttle for a take-off event or to move to a more open position as engine power is moved from part power to climb power.

In a further embodiment of any of the above, the at least one stage comprises at least a first stage and a second stage spaced aft of the first stage, and wherein the at least one variable vane is associated with the first stage.

In a further embodiment of any of the above, the second stage includes at least one variable vane.

In a further embodiment of any of the above, the at least one variable vane comprises a plurality of variable vanes.

In a further embodiment of any of the above, the first and second stages comprise the only stages of the turbine.

In a further embodiment of any of the above, the turbine comprises a high pressure turbine positioned upstream of a low pressure turbine, and wherein the shaft comprises a first shaft driven by the high pressure turbine and including a second shaft driven by the low pressure turbine.

In a further embodiment of any of the above, the engine includes a fan driven by the second shaft via a geared architecture.

In another exemplary embodiment, gas turbine engine includes a first shaft, a first turbine that drives the first shaft, a fan driven by the first shaft via a speed change mechanism, a second shaft rotatable relative to the first shaft, and a second turbine configured to drive the second shaft. The second turbine includes at least one stage comprising a plurality of turbine vanes interspersed with a plurality of turbine blades. The plurality of vanes includes at least one variable vane movable between an open position during a take-off condition. The variable vane is selectively moved toward a closed position as the aircraft progresses to a cruise power condition.

In a further embodiment of any of the above, movement of the at least one variable vane is controlled based on a temperature at a predetermined engine operational condition.

In a further embodiment of any of the above, the variable vane is controlled as a function of corrected fan rotor speed.

In a further embodiment of any of the above, the predetermined engine operational condition comprises a takeoff condition, and wherein the variable vane is configured to be in the open position during take-off conditions when the temperature exceeds a predetermined temperature level, and wherein the variable vane is configured to be in the closed position during cruise conditions.

In a further embodiment of any of the above, the at least one variable vane comprises a plurality of variable vanes.

In a further embodiment of any of the above, the at least one stage comprises at least a first stage and a second stage spaced aft of the first stage, and wherein the at least one variable vane is associated with the first stage.

In a further embodiment of any of the above, the second stage includes at least one variable vane.

In a further embodiment of any of the above, the first and second stages comprise the only stages of the turbine with the first stage including the variable vane and the second stage being comprised of non-variable vanes.

In a further embodiment of any of the above, the second shaft is spaced radially outwardly relative to the first shaft, and wherein the first turbine comprises a low pressure turbine and the second turbine comprises a high pressure turbine.

In a further embodiment of any of the above, the speed change mechanism that drives the fan comprises a geared architecture.

One exemplary method for controlling a gas turbine engine includes the steps of identifying an engine limiting condition and generating a control signal to move a variable turbine vane to a desired vane position to address the engine limiting condition.

In a further embodiment of any of the above, the engine limiting condition comprises a takeoff condition, and additional steps include generating a control signal to move the variable vane to be in a more open position during take-off conditions, and generating a control signal to move the variable vane to be in a more closed position during cruise conditions.

In a further embodiment of any of the above, additional steps include generating a control signal to immediately move the variable vane to a more open position in response to an increase in throttle for a take-off event, or to move to a more open position as engine power is moved from part power to climb power.

These and other features of this application will be best understood from the following specification and drawings, the following of which is a brief description.

DETAILED DESCRIPTION

Figure 1:
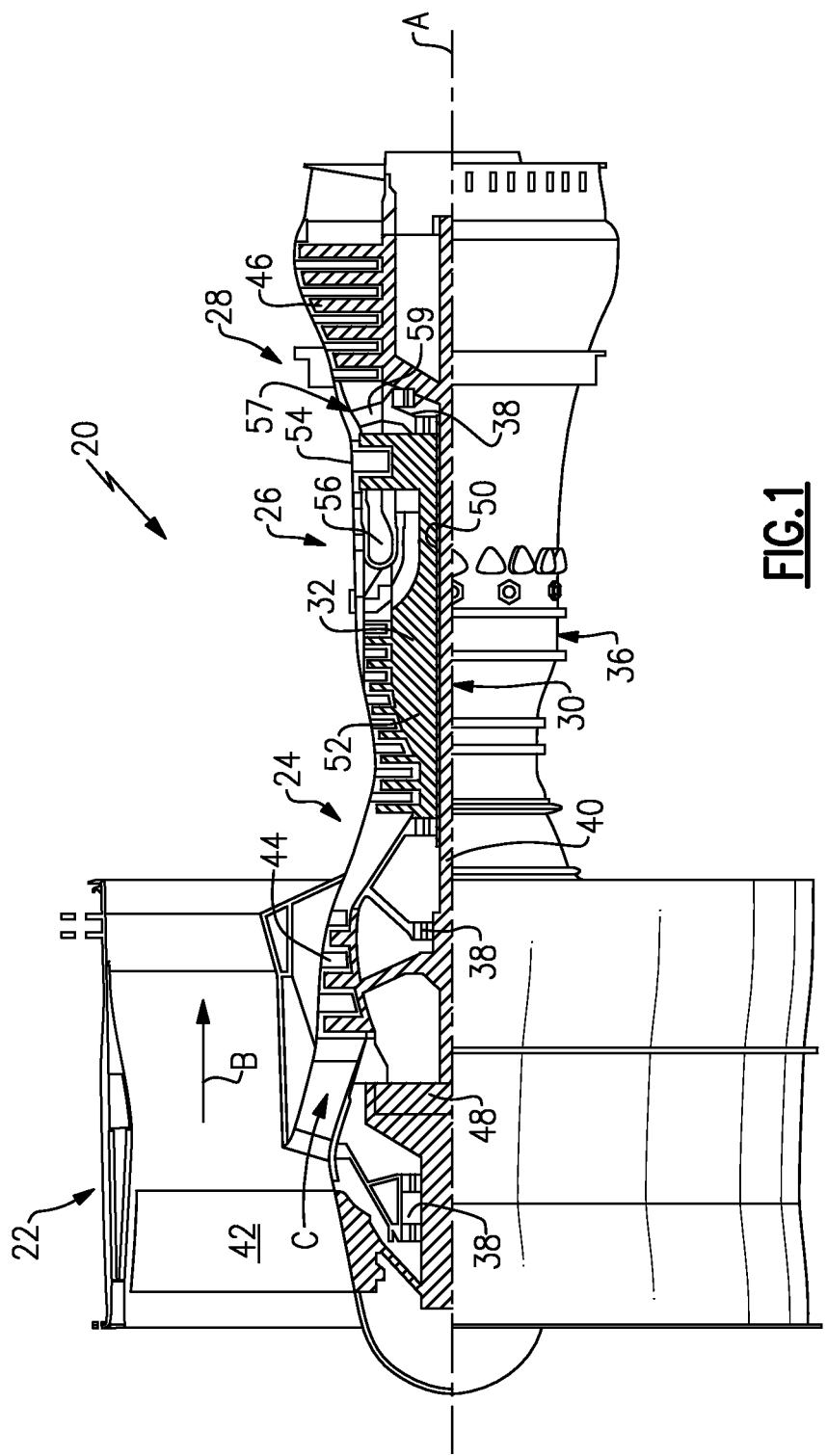
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The turbine section 28 can be comprised of one or more turbines, with each turbine comprising one or more stages as will be discussed below. The turbine section 28 includes a variable vane configuration that can be applied to a first turbine vane or to first and the second vanes. For example, the turbine section 28 could include a first turbine with two stages where the variable vane is used in a first stage or both of the stages. In another example, the turbine includes first and second turbines with the first turbine having one stage with a variable vane configuration, and a second variable vane being in one of the stages of the second turbine. Optionally, the engine 20 could include three turbines with one variable vane configuration being in the first turbine and the second variable vane being in the second turbine. In either the two turbine or three turbine turbofan configuration there is a "fan drive turbine" that drives a fan 42 thru any speed change mechanism or a gearbox. This will be discussed in greater detail below.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects the fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or a star gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ deg\ R)/518.7)^{\wedge}0.5]$. The "Low corrected fan tip speed" as disclosed herein according to one non-limiting embodiment is less than about 1150 ft/second.

Figure 2:
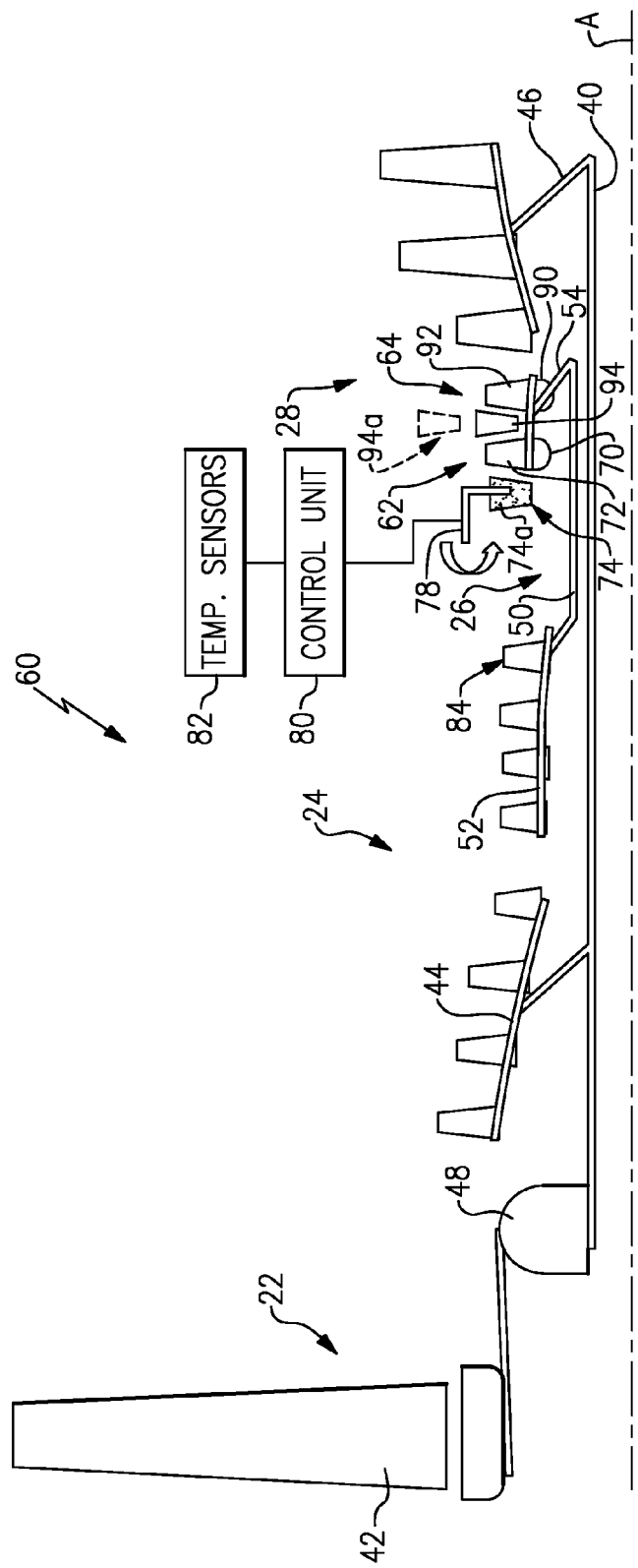
FIG. 2 is a schematic representation of an engine upper half including a high pressure turbine with a variable vane architecture.

A gas turbine engine 60 shown in FIG. 2 includes a two-spool turbofan as described above, which generally incorporates a fan section 22, a compressor section 24, a combustor section 26 and a turbine section 28. In this configuration, the high pressure turbine 54 is configured to have a variable area. The high pressure turbine 54 is comprised of a plurality of stages. In the example shown, the high pressure turbine 54 includes a first stage 62 and a second stage 64.

The first stage 62 includes a first disk 70 that is fixed to drive the high shaft 50. A plurality of first blades 72 is mounted to the first disk 70 for rotation about the axis A. The first stage 62 also includes a plurality of first vanes 74 positioned adjacent the first blades 72. The first vanes 74 are supported by a static structure 78 such as a casing or frame structure.

At least one of the first vanes 74 is a variable vane 74a that is rotatable between an open position to increase core air flow C and a closed/blocking position where core air flow C is reduced. One example of a variable area turbine vane arrangement is found in U.S. Pat. No. 8,007,229 assigned to the same assignee as the present invention, and which is hereby incorporated by reference. The variable vane configuration shown in U.S. Pat. No. 8,007,229 includes an array of vanes with fixed vanes being interspersed with rotating, variable vanes. The variable vanes are moved between open and closed positions by actuators. In the present application, all of the vanes of the first plurality of vanes 74 could comprise variable vanes 74a, or any combination of variable and fixed vanes could be used.

In one example, movement of the at least one variable vane between the open and closed position is controlled based on an engine limiting condition. In one example, the engine limiting condition comprises a temperature at a predetermined engine operational condition. A control unit 80 receives temperature data from one or more temperature sensors 82 and determines whether or not the variable vane should be in the open or closed position. Alternatively, the control unit 80 can control the vane position in response to any parameters that might be correlated to a turbine temperature such as fuel flow and rotor speed and ambient temperature and altitude, the latter three being surrogate for airflow with air temperature so that the control is essentially calculating the air temperature in the turbine.

For example, during hot days where cooling engine components becomes more difficult because the gaspath temperatures are extremely high, the variable vane 74a can be moved to the open position to increase gaspath air flow during takeoff. The variable vanes 74a in the first set of vanes 74 are thus opened during the takeoff and early climb segment where the overall design of the turbomachinary is constrained by a maximum allowable temperature level that is very high and near the limits of materials used for a rear stage 84 of the high pressure compressor 52. The term "limits" refers to, for example, the limit of the temperatures and speeds that yield adequate rear high pressure compressor disk life, as well as other economically limiting considerations, and as well as limits such as FAA certified rotor speed limits or FAA certified exhaust gas temperature limits.

As engine power is reduced through climb and into cruise, ambient and ram air temperatures are cooler and the variable vanes 74a of the first stage 62 of the high pressure turbine 54 are selectively and possibly progressively closed to raise the overall pressure ratio. As moving the variable vane into the closed position reduces the air flow, and hence gaspath cooling effect, this also results in an increase in temperatures at various compressor stages of the compressor section 24. This provides for a desirable, higher compression ratio of the high pressure compressor, and further provides improved engine performance within the limits of the temperatures and speeds that yield adequate rear high pressure compressor disk life because not only are the gaspath conditions cooler but also rotor speeds are reduced reflecting the reduced power and reduced ambient temperatures.

In another example, the engine limiting condition comprises identification of a takeoff event. The variable vane is moved to the open position during takeoff. Further, to reduce the transient effects of the engine due to the length of time to accelerate components during a throttle request for take-off, the variable vane 74a can be configured to immediately move to the open position in response to an increase in throttle for a take-off event. The movement of the vanes, due to their lower inertia, to the open position occurs more quickly than the amount of time required for the engine rotors to reach the desired rotational speed for takeoff and the resulting transient spike in transient backpressure on the high pressure compressor 52 is reduced. In one example, the variable vane is controlled as a function of corrected fan rotor speed. Corrected fan rotor speed is the actual fan rotor rotational speed in rpm divided by an industry standard correction of [(Tram ambient deg R)/518.7)^0.5].

As discussed above, the variable vane 74a is associated with the first stage. The second stage 64 includes a second disk 90 that is fixed to drive the high shaft 50 or alternatively a second shaft to turn another part of the engine's compression section. A plurality of second blades 92 is mounted to the second disk 90 for rotation about the axis A. The second stage 64 also includes a plurality of second vanes 94 positioned adjacent the second blades 92. The second vanes 94 are supported by the static structure 78.

In one example, the first stage 62 includes variable vanes 74 while the second stage 64 only includes fixed vanes 94. In another example, the second stage 64 can also include at least one variable vane rotatable between an open and closed position as schematically indicated at 94a.

In one example, the at least one variable vane comprises a plurality of variable vanes mixed with fixed vanes. In another example, all of the vanes in the first stage 64 comprise variable vanes. Similarly, in a configuration where the second stage includes variable vanes, any combination of fixed and variable vanes can be used, or all of the vanes could comprise variable vanes.

In one example, the first 62 and second 64 stages comprise the only stages of the high pressure turbine 54.

By providing a variable vane configuration in the high pressure turbine, an engine designer has another variable to modify temperatures at the back of the high pressure compressor and in the turbine to beneficially change the relationship between hot day takeoff, climb, and cruise. Relative to a machine with fixed first stage vanes in the turbine, the above disclosed configuration will have lower compressor section temperatures when the vanes are opened at takeoff. Further, this configuration will have a desirable higher overall pressure ratio at cruise relative to a fixed area machine where temperatures at various stages of the compressor at takeoff were limiting. By opening the vanes, the airflow through the compressor and turbine is increased, which reduces the gaspath temperatures.

For example, if a certain compressor stage temperature is set at a maximum with the vane open for fatigue life reasons, the machine will have adequate life at potentially damaging takeoff conditions. Similarly, if a turbine blade has a maximum temperature with the vane open, the designer can arrange for that temperature while benefiting the cruise condition by closing the vane and running the blade beneficially hotter at the non-limiting high altitude ambient temperature condition. Further, the machine will have a beneficial overall pressure ratio at cruise where damage to the disks due to thermal gradient is minimal. Turbine part life is comparable or improved over a fixed area configuration depending on how the vane areas are set up.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
   a shaft;
   a turbine configured to drive the shaft, the turbine including at least one stage comprising a plurality of turbine vanes adjacent a plurality of turbine blades; and
   wherein the plurality of vanes includes at least one variable vane movable between a closed position to reduce gaspath flow and an open position to increase gaspath flow, and wherein movement of the at least one variable vane is controlled based on at least one engine limiting condition wherein the at least one engine limiting condition comprises at least a takeoff condition, and wherein variable vane position is controlled based on inputs comprising at least fuel flow and ambient temperature to provide an output to control temperature at one or more desired engine locations.

2. The gas turbine engine according to claim 1, wherein the engine limiting condition comprises a temperature at a predetermined engine operational condition.

3. The gas turbine engine according to claim 2, wherein the variable vane is configured to be in the open position during the take-off condition when the temperature exceeds a predetermined temperature level that is based on a maximum allowable temperature level at a rear stage of a high pressure compressor.

4. The gas turbine engine according to claim 2, wherein the variable vane is configured to be in a more closed position during a cruise condition than in a takeoff position.

5. The gas turbine engine according to claim 1, wherein the variable vane is configured to be in a more open position during take-off conditions, and wherein the variable vane is configured to be in a more closed position during cruise conditions.

6. The gas turbine engine according to claim 5, wherein the variable vane is initiated to immediately move to a more open position in response to an increase in throttle for a take-off event or to move to a more open position as engine power is moved from part power to climb power.

7. The gas turbine engine according to claim 1, wherein the variable vane is controlled as a function of corrected fan rotor speed that comprises actual fan rotor speed modified by a temperature correction factor.

8. The gas turbine engine according to claim 1, wherein the turbine comprises a high pressure turbine, and comprising at least a first stage and a second stage spaced aft of the first stage, and wherein the at least one variable vane is associated with the first stage.

9. The gas turbine engine according to claim 8, wherein the second stage includes at least one variable vane.

10. The gas turbine engine according to claim 8, wherein the at least one variable vane comprises a plurality of variable vanes.

11. The gas turbine engine according to claim 8, wherein the first and second stages comprise the only stages of the high pressure turbine, and including a low pressure turbine downstream of the high pressure turbine.

12. The gas turbine engine according to claim 8, including a low pressure turbine positioned downstream of the high pressure turbine, and wherein the shaft comprises a first shaft driven by the high pressure turbine and including a second shaft driven by the low pressure turbine, and including a fan driven by the second shaft via a geared architecture.

13. The gas turbine engine according to claim 1, wherein the turbine comprises a high pressure turbine positioned upstream of a lower pressure turbine, and wherein the shaft comprises a first shaft driven by the high pressure turbine and including a second shaft driven by the lower pressure turbine, and wherein the high pressure turbine includes first and second stages with the at least one variable vane being positioned in the second stage.

14. The gas turbine engine according to claim 1, including a temperature sensor positioned to measure a temperature at the variable vane, and wherein movement of the variable vane is controlled based on a temperature measured at the variable vane.

15. A gas turbine engine comprising:
    a first shaft;
    a first turbine that drives the first shaft;
    a fan driven by the first shaft via a speed change mechanism;
    a second shaft rotatable relative to the first shaft; and
    a second turbine configured to drive the second shaft, the second turbine including at least one stage comprising a plurality of turbine vanes adjacent a plurality of turbine blades, and wherein the plurality of vanes includes at least one variable vane movable between an open position during a take-off condition and is selectively closed as the air craft progresses to a cruise condition, and wherein variable vane position is controlled based on inputs comprising at least fuel flow and ambient temperature to provide an output to control temperature at one or more desired engine locations.

16. The gas turbine engine according to claim 15, wherein movement of the at least one variable vane is controlled based on a temperature at a predetermined engine operational condition.

17. The gas turbine engine according to claim 16, wherein the variable vane is configured to be in the open position during take-off conditions when the temperature exceeds a predetermined temperature level that is based on a maximum allowable temperature level at a rear stage of a high pressure compressor, and wherein the variable vane is configured to be in the closed position during cruise conditions.

18. The gas turbine engine according to claim 15, wherein the variable vane is controlled as a function of corrected fan rotor speed that comprises actual fan rotor speed modified by a temperature correction factor.

19. The gas turbine engine according to claim 15, wherein the at least one variable vane comprises a plurality of variable vanes.

20. The gas turbine engine according to claim 15, wherein the at least one stage comprises at least a first stage and a second stage spaced aft of the first stage, and wherein the at least one variable vane is associated with the first stage.

21. The gas turbine engine according to claim 20, wherein the second stage includes at least one variable vane.

22. The gas turbine engine according to claim 20, wherein the first and second stages comprise the only stages of the turbine with the first stage including the variable vane and the second stage being comprised of non-variable vanes.

23. The gas turbine engine according to claim 15, wherein the second shaft is spaced radially outwardly relative to the first shaft, and wherein the first turbine comprises a low pressure turbine and the second turbine comprises a high pressure turbine, and comprising at least a first stage and a second stage spaced aft of the first stage, and wherein the at least one variable vane is associated with the second stage.

24. The gas turbine engine according to claim 15, wherein the speed change mechanism that drives the fan comprises a geared architecture.

25. The gas turbine engine according to claim 15, wherein movement of the at least one variable vane is controlled based on a temperature measured at an inlet to the second turbine.

26. A method for controlling a gas turbine engine comprising the steps of:
   (a) identifying at least one engine limiting condition that includes at least a takeoff condition; and
   (b) generating a control signal to actuate a control to move a variable turbine vane to a desired vane position to address the engine limiting condition; and
   (c) moving the variable vane via the control, where moving the variable vane is based on inputs comprising at least fuel flow and ambient temperature to provide an output to control temperature at one or more desired engine locations.

27. The method according to claim 26, including generating a control signal to move the variable vane to be in a more open position during take-off conditions, and generating a control signal to move the variable vane to be in a more closed position during cruise conditions.

28. The method according to claim 27, including generating a control signal to immediately move the variable vane to a more open position in response to an increase in throttle for a take-off event, or to move to a more open position as engine power is moved from part power to climb power.

29. The method according to claim 26, including controlling the variable vane as a function of corrected fan rotor speed that comprises actual fan rotor speed modified by a temperature correction factor.

30. The method according to claim 26, including moving the variable vane to be in an open position during the take-off condition when the temperature exceeds a predetermined temperature level that is based on a maximum allowable temperature level at a rear stage of a high pressure compressor.

31. The method according to claim 26, including positioning the variable turbine vane in a first stage of a high pressure turbine, and moving the variable turbine vane based on a temperature measured at an inlet to the high pressure turbine.

32. The method according to claim 26, including positioning the variable turbine vane in a high pressure turbine that includes first and second stages, the variable turbine vane being positioned within the second stage which is downstream of the first stage, and moving the variable turbine vane to the desired vane position to address the engine limiting condition.

* * * * *